(12) United States Patent
Dollinger

(10) Patent No.: US 9,904,821 B2
(45) Date of Patent: Feb. 27, 2018

(54) AUTOMATED TRACKING AND IDENTIFICATION IN A CROP PRODUCTION CYCLE

(71) Applicant: CNH Industrial America LLC, New Holland, PA (US)

(72) Inventor: Tyson Dollinger, Mazon, IL (US)

(73) Assignee: CNH Industrial America LLC, New Holland, PA (US)

( * ) Notice: Subject to any disclaimer, the term of this patent is extended or adjusted under 35 U.S.C. 154(b) by 234 days.

(21) Appl. No.: 14/547,692

(22) Filed: Nov. 19, 2014

(65) Prior Publication Data

US 2016/0140367 A1    May 19, 2016

(51) Int. Cl.
| | | |
|---|---|---|
| G06K 7/10 | (2006.01) | |
| G06K 19/07 | (2006.01) | |
| A01B 79/00 | (2006.01) | |

(52) U.S. Cl.
CPC ..... *G06K 7/10297* (2013.01); *G06K 7/10376* (2013.01); *G06K 19/0723* (2013.01); *A01B 79/00* (2013.01)

(58) Field of Classification Search
CPC . A01G 1/00; A01G 7/00; A01G 7/045; A01G 31/02; A01C 1/00
See application file for complete search history.

(56) References Cited

U.S. PATENT DOCUMENTS

| | | | |
|---|---|---|---|
| 6,671,698 B2 | 12/2003 | Pickett et al. | |
| 2001/0029996 A1* | 10/2001 | Robinson | B65G 65/005 141/11 |
| 2003/0182144 A1* | 9/2003 | Pickett | G06Q 10/06 705/317 |
| 2005/0075900 A1 | 4/2005 | Arguimbau, III | |
| 2012/0010789 A1* | 1/2012 | Dulnigg | A01G 1/00 701/50 |
| 2016/0071410 A1* | 3/2016 | Rupp | G06Q 50/02 701/50 |

* cited by examiner

*Primary Examiner* — Nabil Syed
(74) *Attorney, Agent, or Firm* — Rebecca L. Hankel; Richard K. DeMille

(57) ABSTRACT

An improved system for tracking the application of crops and field amendments being applied to fields is disclosed. A series of passive communication devices are included in products being applied to the field. As seed and other products are supplied to the field, the passive communication devices are delivered to the field as well. A reader is mounted to the agricultural vehicle and is in communication with the passive devices to read data stored on each device. The data may include the type and variety of product in which the passive devices were supplied. A controller on the vehicle receives data from the reader to identify what product has been applied to the field. The controller may store data on any additional product subsequently applied to the field and/or may verify that subsequent product is acceptable for application to a crop in the field prior to application.

13 Claims, 5 Drawing Sheets

AUTOMATED TRACKING AND IDENTIFICATION IN A CROP PRODUCTION CYCLE

BACKGROUND OF THE INVENTION

The subject matter disclosed herein relates generally to a system for tracking crop throughout a production cycle, and in particular, to a system integrated with precision farming techniques to track a crop through all phases of the production cycle, including planting, maintenance, such as fertilizing, watering, and the like, harvesting, and delivering the crop to a processing facility.

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have performance inconsistencies between different areas. That is because a field can have a wide variety of soil types and management zones such as irrigated and non-irrigated zones in different areas. Seed companies are developing multiple varieties of each of their seed product types, with the different varieties offering improved performance characteristics for different types of soil and management zones. Efforts have been made to plant multiple varieties of a particular seed product type in different areas of fields with different soil types or management zones. These efforts include seeders with complex valves that change which stored seeds can enter a metering box. Other efforts include planters that have different hulk fill hoppers and require the reservoir for each seed meter to be completely cleaned out or planted out before a different seed variety can be delivered to the seed meters. Some planters allow for planting two varieties and include two separate and distinct seed meters at every row unit.

Still further technological advances have allowed for position-based precision farming. Agricultural vehicles have controllers included in the vehicle and vehicle location systems, such as a global position system (GPS), to monitor operation of the vehicle at the vehicle's location. Monitoring of the agricultural vehicle may, for example, record a crop being planted in a field and/or field amendments, such as fertilizer, pesticide, herbicide, or water being added to the field at particular coordinates. As an agricultural vehicle such as a planter or sprayer traverses a field, the controller may record location coordinates from the GPS as well as operation of the vehicle including, for example, a product being delivered to the field, the time and date of application, and the rate at which it is being applied. The controllers may further be configured to apply product and/or field amendments at particular locations. The controller may read location coordinates from the GPS and control delivery systems on the agricultural vehicle to deliver desired product to the field at desired rates based on the coordinates.

However, operator intervention may be required and relied upon at several stages throughout the precision farming process. For example, the operator is required to enter the type of crop and, potentially, a specific variety of the crop being delivered to the field. The operator may similarly be required to enter types and varieties of field amendments being applied to the field. Further, residual product may remain in a hopper when a new product is loaded, resulting either in the old product being intermixed with the new product or having the old product be delivered first prior to application of the new product. Further, a herbicide not intended for a particular crop may be inadvertently loaded into a hopper. Although the operator may enter the intended herbicide and/or product, the incorrect herbicide may damage or kill a crop that is not tolerant of the unintended herbicide.

Therefore, it would be desirable to provide a system to track the application of crops and field amendments being applied to fields that reduce the potential for operator error.

SUMMARY OF THE INVENTION

The present invention is an improved system for tracking the application of crops and field amendments being applied to fields. A series of passive communication devices are included in products being applied to the field. As seed and/or other field amendments are supplied to the field, the passive communication devices are delivered to the field as well. A reader is mounted to the agricultural vehicle applying the product or to a tow vehicle for the agricultural vehicle. Subsequent vehicles entering the field may also include a reader. The reader is in communication with the passive devices to read data stored on each device. The data may include, for example, the type and variety of product in which the passive devices were supplied. A controller on the vehicle receives data from the reader to identify what product has been applied to the field. The controller may also store data on any additional product subsequently applied to the field and/or be used to verify that subsequent product may be applied to a crop in the field prior to application.

According to one embodiment of the invention, a system for tracking agricultural products applied to a field is disclosed. The system includes a plurality of identification devices, where each of the identification devices is inserted into a product to be applied to the field, and a distribution system configured to dispense the product to the field. Each of the identification devices is dispensed to the field along with the product. Each of the identification devices includes a memory device and a communication device. The memory device stores data corresponding to the product in which its corresponding identification device is inserted.

According to another aspect of the invention, at least one agricultural vehicle traverses the field after the product is dispensed, and each agricultural vehicle includes a controller to control operation of the agricultural vehicle. A reader is mounted to each agricultural vehicle and is in communication with the controller. The reader includes a communication device which establishes a communication link between the reader and each of the plurality of identification devices in the field as the agricultural vehicle traverses the field. Each agricultural vehicle may also include a data storage device and a positioning system operable to generate a position signal. The reader may read the data from each of the plurality of identification devices via the communication link. The data from each of the plurality of identification devices and the position signal, corresponding to a location at which each of the plurality of identification devices is read, are stored in the data storage device.

According to yet another aspect of the invention, each agricultural vehicle traversing the field after the product is dispensed may be configured to apply an amendment to the field, and data corresponding to the amendment applied to the field is also stored in the data storage device. The controller may receive the data from each of the plurality of identification devices and generate a plurality of control signals as a function of the data from each of the plurality of identification devices to control operation of the agricultural vehicle.

According to still another aspect of the invention, one of the agricultural vehicles may be a harvester. The harvester may have a plurality of harvest identification devices and a programmer mounted to the harvester. The programmer writes at least a portion of the data from the identification devices to each of the harvest identification devices, and a delivery system is configured to insert each of the harvest identification devices into the product being harvested from the field.

According to another embodiment of the invention, a method of tracking an agricultural product during its production cycle is disclosed. The method includes the steps of inserting a plurality of identification devices within a quantity of seed for the agricultural product and distributing the identification devices on a field along with the seed. Each of the identification devices includes a memory device and a communication device. The memory device stores data corresponding to the seed in which the identification device is inserted. The identification devices and seed are distributed with an agricultural vehicle equipped with a positioning system operable to generate a position signal. The position signal from the positioning system is read while the plurality of identification devices and the seed are distributed and a distribution map, identifying where the plurality of identification devices and the seed are distributed within the field, may be generated.

According to another aspect of the invention, a second agricultural vehicle traverses the field after the seed is distributed. The second agricultural vehicle is configured to apply an amendment to the field and includes a memory device storing an application table. The second agricultural vehicle reads the data from the identification devices and compares the data from the plurality of identification devices to the application table. The second agricultural vehicle is enabled to apply the amendment to the field when the data from the plurality of identification devices matches data in the application table, indicating the amendment is compatible with the seed applied to the field, and the second agricultural vehicle is prevented from applying the amendment to the field when the data from the plurality of identification devices fails to match data in the application table, indicating the amendment is not compatible with the seed applied to the field.

According to still another embodiment of the invention, a precision farming system includes an improved system for monitoring the crop product cycle. The precision farming system has a plurality of agricultural vehicles which dispense at least one crop product to a field to begin a crop product cycle, dispense at least one field amendment to the field during the crop product cycle, and harvest the crop product from the field to complete the crop product cycle. The system for monitoring the crop product cycle includes a plurality of identification devices inserted into one of the crop products to be dispensed to the field and a distribution system on one of the agricultural vehicles configured to dispense the crop product and the identification devices to the field. Each of the plurality of identification devices includes a communication device and a memory device configured to store data corresponding to the crop product in which the corresponding identification device is inserted.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings.

The drawings furnished herewith illustrate a preferred construction of the present invention in which the above advantages and features are clearly disclosed as well as others which will be readily understood from the following description of the illustrated embodiment.

DETAILED DESCRIPTION

The various features and advantageous details of the subject matter disclosed herein are explained more fully with reference to the non-limiting embodiments described in detail in the following description.

Figure 1:
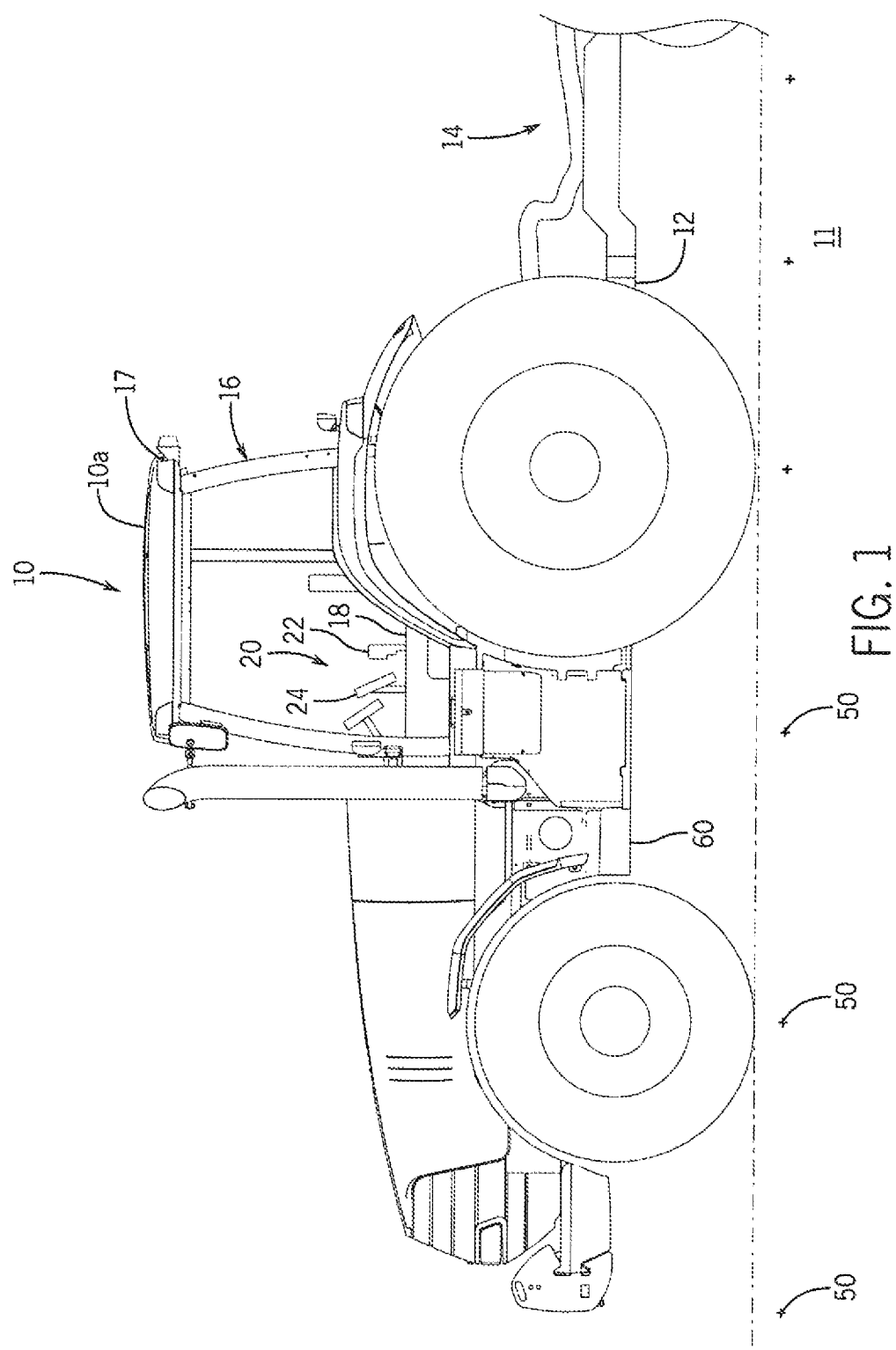
FIG. 1 is a side elevation view of an exemplary agricultural vehicle implementing one embodiment of the present invention.

Referring to FIG. 1, an agricultural vehicle 10, such as a tractor 10a, including a hitch 12 configured to tow another implement, and the hitch assembly 14 of the towed implement are illustrated. A positioning system, such as a GPS unit 17 is mounted to the top of the cab 16 and is in communication with the controller 20. The agricultural vehicle 10 further includes a near-field communication (NFC) reader 60 mounted to the vehicle 10 and configured to communicate with NFC devices 50 in the field 11. Although the illustrated agricultural vehicle 10 is a tractor 10a, configured to tow other implements, it is contemplated that the agricultural vehicle 10 may be another agricultural vehicle, either self-propelled or towed, including, but not limited to planters, sprayers, combines, harvesters, carts, harrows, or tillers.

Figure 5:
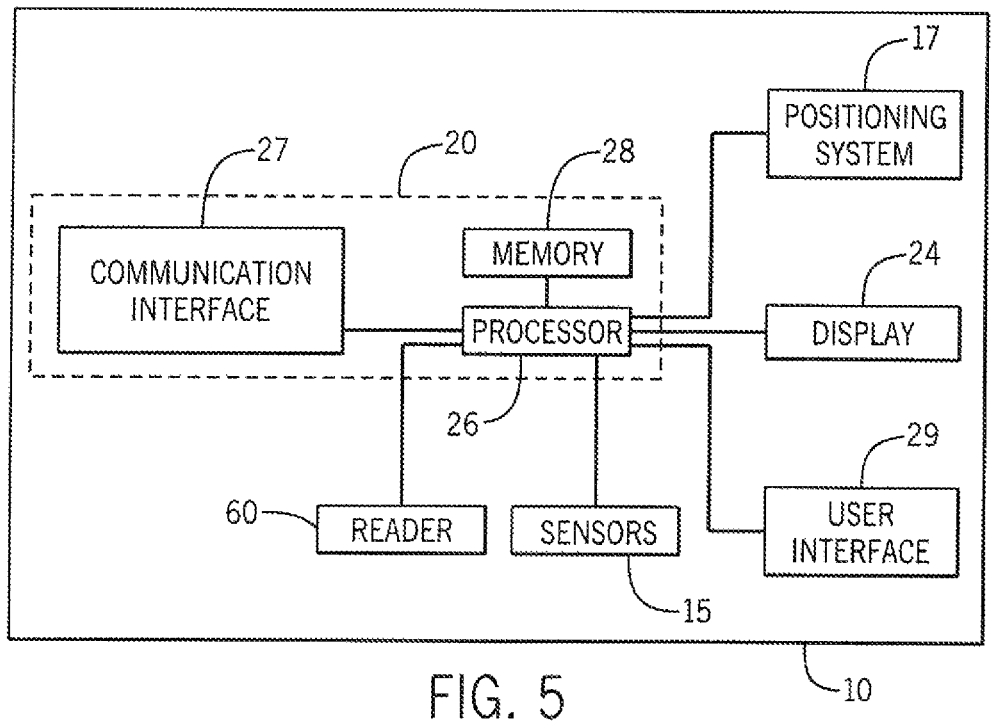
FIG. 5 is block diagram representation of a control system implementing one embodiment of the present invention.

The agricultural vehicle 10 also includes a controller 20 mounted in the cab 16 of the vehicle 10. The controller 20 may include user interface devices 29, such as a joystick 22 mounted on an armrest 18 of the agricultural vehicle to receive input from an operator. The controller 20 may further include a display device 24, such as a video display screen or a touch screen configured to provide information to the operator. Referring also to FIG. 5, the controller 20 includes a processor 26 in communication with a memory device 28. It is contemplated that the processor 26 may be a single device or multiple devices operating in parallel or independently without deviating from the scope of the invention. Further, the processor 26 may be a microprocessor, a field programmable gate array (FPGA), application specific integrated circuit (ASIC), discrete logic devices, or any combination thereof. It is further contemplated that the memory device 28 may be a single device or multiple devices, persistent or non-persistent memory, or any combination thereof. The processor 26 is configured to execute one or more program modules stored in the memory device 28. The controller 20 also includes a communication interface 27 which may include, but is not limited to, a network interface card (NIC) 116 to communicate, for example, via a wireless Internet connection, a Bayonet Neill-Concelman (BNC) connector for coaxial cable, a Universal Serial Bus (USB) port, and a wireless communication (WiFi) port.

Figure 2:
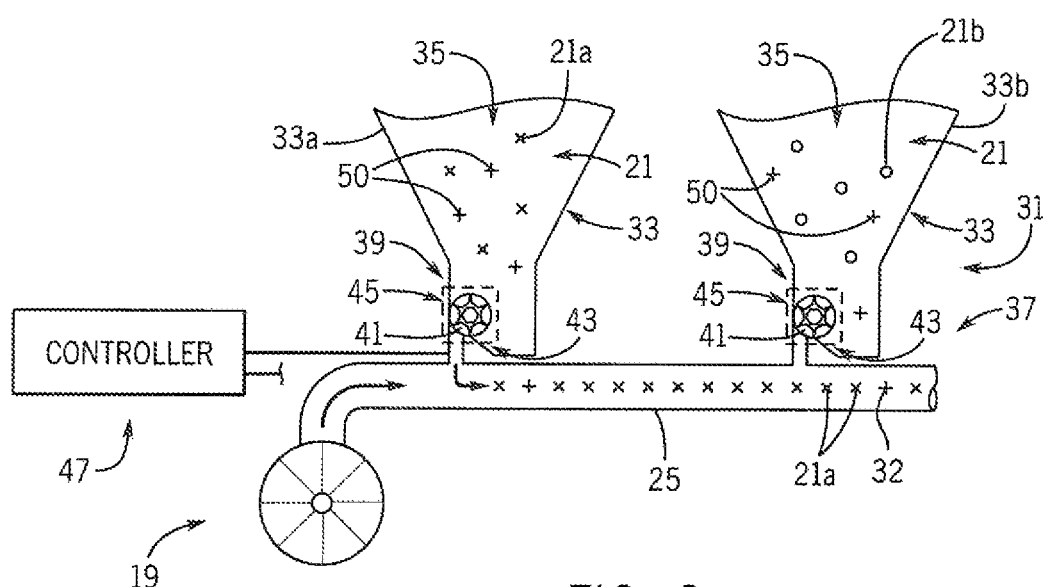
FIG. 2 illustrates a simplified schematic side elevation and cross-sectional representation of a seeder incorporating passive communication devices according to one embodiment of the invention.

Referring next to FIG. 2, a portion of an exemplary system for distributing the NFC devices 50 to the field 11 is illustrated. The exemplary system is a portion of a planter configured to distribute seed and/or other particulate, such as a fertilizer, to a field 11. The planter includes a bulk storage system 31 which includes one or more hoppers 33 configured to hold product to be distributed. The bulk storage system 31 has multiple compartments 35, illustrated as individual hoppers 33. According to another embodiment of the invention, a single hopper 33 may have compartments 35 that are separated by divider walls or partitions. According to the illustrated embodiment, a first hopper 33*a* includes a first seed 21*a* and a second hopper 33*b* includes a second seed 21*b*.

Figure 3:
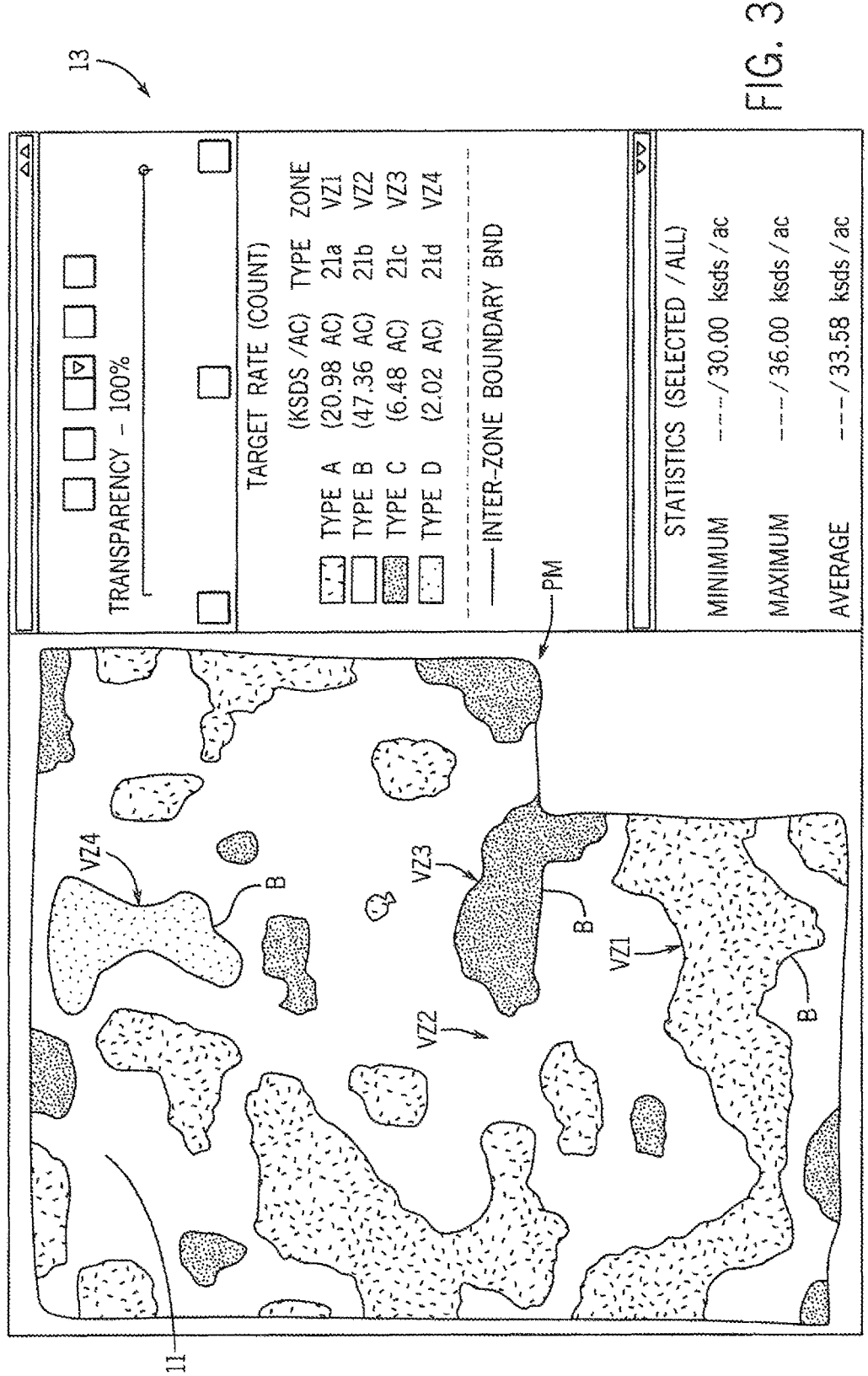
FIG. 3 illustrates an exemplary seed type prescription map for use with implements incorporating the system(s) in accordance with the present invention.

Referring next to FIG. 3, different seeds 21*a*, 22*b*, 22*c*, 22*d* may be planted in different zones, shown as zones VZ1, VZ2, VZ3, VZ4 in the illustrated prescription map (PM) 13. The different type or variety zones VZ1, VZ2, VZ3, VZ4 of the agricultural field 11 are defined at least in part by characteristics relating to soil type, crop management, or a combination thereof. Although the seed 21 may be described elsewhere herein as different types 21*a*, 21*b*, 21*c*, 21*d*, it is understood that the description of the different types includes different varieties and different products. In other words, the different types 21*a*, 21*b*, 21*c*, 21*d* of seed 21 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide-tolerant seed, or other different products. The different seed products can further include different crop seeds such as corn and soybeans.

Referring again to FIG. 2, the planter also includes an airflow system 19 used to convey seeds 21 of each type through a pneumatic delivery system 25 to row units for release onto the field 11. The airflow system 19 includes a positive air pressure source and may include a vacuum source for establishing positive and vacuum pressures and corresponding air flows. The positive an pressure source and vacuum sources may be known pumps, fans, blowers, and/or other known airflow system components. The airflow system 19 is in communication with the pneumatic delivery system 25 providing an airflow that moves the seeds 21 and the NFC devices 50 from the hoppers 33 to row units on the planter for release onto the field 11.

Each hopper 33 may also include a metering system 39 for delivering the seeds 21 and NFC devices 50 from the hopper 33 into the pneumatic delivery system 25. The metering system 39 releases or delivers seeds 21, such as by calibrated metering, from bulk storage in each hopper 33 into the pneumatic delivery system 25 for deliver to the row units and, in turn, to the field 11. Each metering system 39 includes a metering box 45 and a metering roller 41. The metering roller 41 may be a calibrated fluted roller arranged at an outlet 43 of the hopper 33. The rollers 41 are driven to rotate by electronic, pneumatic, or hydraulic motors (not shown) as controlled by a controller 47. It is contemplated that the controller 47 may be the controller 20 in the agricultural vehicle 10. Optionally, the controller 47 may be a separate controller mounted on the towed implement. The controller 47 is configured to control each roller 41 and the airflow system 19 to deliver seeds 21 to the field 11, as explained in greater detail herein, according to the prescription map.

As also illustrated in FIG. 2, passive NFC devices 50 may be intermixed with the seed 21. Each of the passive NFC devices 50 is preferably of a similar size and shape of the seed 21*a*, 21*b* in which it is intermixed. By intermixing the passive NFC devices 50 into the seed 21, the passive NFC devices 50 are delivered to the field using the same delivery system as the seeds 21. It is contemplated that the passive NFC devices 50 are one-half of an automatic identification and data capture (AIDC) system, where the AIDC system automatically identifies objects, captures data about the object, and enters the data into a computer system without operator intervention.

Figure 6:
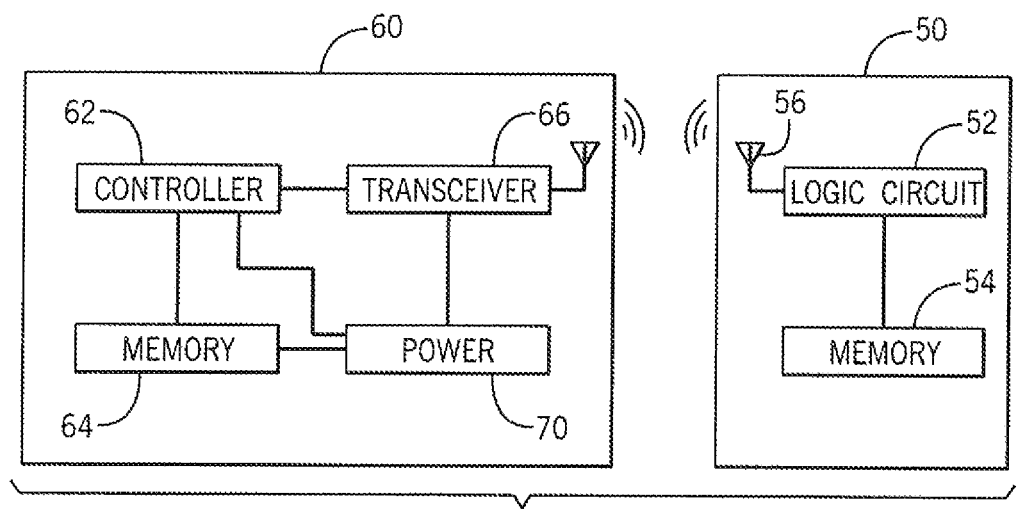
FIG. 6 is a block diagram of a near-field communication reader and tag according to one embodiment of the present invention.

According to one embodiment of the system, the AIDC system is a radio frequency identification (RFID) system. In an RFID system, one component is a RFID reader 60 and the other component is the transponder (or passive NFC device 50) which reacts when the RFID reader interrogates the passive NFC device 50. The RFID reader 60 is operatively connected to the agricultural vehicle 10. Referring also to FIG. 6, the RFID reader 60 includes a power circuit 70. The power circuit 70 may be configured to receive power from the vehicle 10, for example, from a battery or an alternator in the vehicle 10, or a combination thereof. Optionally, the power circuit 70 may include its own battery which powers the reader 60. The RFID reader 60 includes a controller 62 and a memory device 64. The controller 62 may include a microprocessor, a field programmable gate array (FPGA), application specific integrated circuit (ASIC), discrete logic devices, or any combination thereof. It is further contemplated that the memory device 64 may be a single device or multiple devices, persistent or non-persistent memory, or any combination thereof. The RFID reader 60 also includes a transceiver circuit 66 configured to convert data between a digital signal and an RF signal. The RF signal is transmitted via an antenna 68 and is used to activate the passive NFC device 50. The transceiver circuit 66 also receives RF signals transmitted from each passive NFC device 50.

Each of the passive NFC devices 50 is activated by the RFID reader 60. The RFID reader 60 transmits a low power electromagnetic wave to the NFC device 50. The electromagnetic wave may be a separate, wake-up transmission used to activate the NFC device 50 or it may be part of a communication packet including data being transmitted to the NFC device 50. The electromagnetic wave is received via an antenna 56 and transmitted to a logic circuit 52 on the NFC device 50. The logic circuit 52 converts the low power electromagnetic wave to energy, for example, by charging a capacitive element in the logic circuit 52. When the NFC device 50 is powered up, the logic circuit 52 is configured to read data stored in a memory device 54 on the passive NFC device 50, convert the data to a radio frequency (RF)

signal, and transmit the RF signal via the 56 antenna 40 back to the NFC reader 60. The energy stored in the logic circuit 52 is sufficient to execute the read and transmit steps. As the NFC reader 60 moves beyond the range of the NEC device 50, the energy stored in the logic circuit 52 dissipates and the NFC device 50 returns to a passive state, awaiting a subsequent low power electromagnetic wave from the NFC reader 60 to re-enable the NFC device 50.

In operation, the disclosed system provides an improved method for tracking a crop throughout a production cycle. According to one embodiment of the invention, the tracking is implemented within a precision farming system. It is contemplated that a number of agricultural implements, towed or self-propelled, may be utilized to distribute a crop in the field, provide amendments to the field, such as fertilizer, pesticide, and herbicide, and to harvest the crop. Each of the agricultural implements or a vehicle towing the agricultural implement may include a position system 17, such as a GPS unit, to provide a signal corresponding to the current location of the vehicle. Although the system for tracking a crop throughout a production cycle will be discussed herein with respect to a precision farming system, it is contemplated that individual agricultural vehicles or vehicles not traditionally considered part of a precision farming system may implement the tracking system without deviating from the scope of the invention.

Initially, a product to be distributed by the precision farming system will include a number of identification devices 50. Preferably, the identification devices 50 will be of similar shape and/or size to the product being supplied (e.g., seed for the crop) such that the identification devices 50 may be distributed in the same manner as the product. The identification devices 50 are included in a sufficient concentration that they will be distributed generally over the same area as the product to be distributed. Each identification device 50 includes a memory device 54 and a communication device. For exemplary purposes, the identification device will be described as a NFC device 50 where the communication device includes the logic circuit 52 and antenna 56 of the NEC device 50. The manufacturer of the product may initially store data in the memory 54 of each identification device 50 corresponding to the product in which it is to be inserted. The data may include, but is not limited to, a type of product, such as a crop product, herbicide, pesticide, or fertilizer, or a variety of the product, such as a herbicide-tolerant or herbicide-intolerant variety of a particular crop product. The data may further include specific lot numbers of the product as produced by the manufacturer, the date of production, or the size or shape of the product. Optionally, identification devices 50 may be sold separately in bulk quantities. A farmer may have a programmer and write the data into each of the identification devices 50 prior to mixing the programmed identification devices 50 into the product.

The first step in the product cycle is distributing seeds 21 for the product. As shown in FIG. 2, seeds 21 are placed in a hopper 35 of a planter for distribution. If a prescription map 13 is stored in the memory 28 of the controller 20, different seeds 21a, 21b may be stored in different hoppers 35a, 35b and distributed in the field according to the prescription map 13. The identification devices 50 are included within the seeds 21 and distributed by the planter to the field 11 along with each seed type 21a, 21b. The data written to each identification device 50 corresponds to the type of seed 21a, 21b in which it is inserted.

After distributing the seed 21 to the field 11, subsequent amendments to the field may need to be applied. The amendments required are dependent, for example, on the field conditions, the type of crop product, and the variety of crop product distributed. The amendments may include fertilizer, herbicide, and/or pesticide. According to one embodiment of the invention, additional identification devices 50 may be included with the amendments and sized to be delivered along with the amendments. Data may be stored in each identification device 50 corresponding to the type of amendment being applied, including composition, version and/or lot numbers of the amendment. Optionally, the amendments may include no identification devices 50 and may be applied in a traditional manner.

As each amendment is being applied, the reader 60 mounted to the agricultural vehicle 10, or to an implement towed by an agricultural vehicle 10, which is applying the amendment establishes communication links with the identification devices 50. The reader 60 may continually transmit a carrier signal which has sufficient energy to enable passive identification devices 50. As the agricultural vehicle 10 traverses the field, the reader 60 repeatedly comes within communication range of an identification device 50 in the field 11, enables the identification device 50, receives data from the identification device 50, and moves beyond range of the identification device 50.

The data received from the identification device 50 is passed to the controller 20 of the agricultural vehicle 10 and used to improve the precision of applying each amendment. For example, just as an agricultural vehicle 10 may distribute multiple seeds 21a, 21b during planting, the agricultural vehicle 10 may include multiple amendments loaded into separate holding 35 for distribution to the field 11. Each amendment may be formulated to benefit one of the types of seeds 21a, 21b planted in the field. Rather than relying on the prescription map 13, the controller 20 receives the data from each identification device 50 to identify which seed 21a or 21b is located in that area of the field 11. The controller 20 then dispenses the appropriate amendment in response to the data received from the identification device 50. By reading data from identification devices 50 in the field 11, the controller 20 is more accurately able to apply the correct amendment to different areas of the field.

According to another aspect of the invention, an application table may be loaded into the memory 28 of the controller 20. The application table may include a list of crop products and a list of amendments that are suitable for application to the crop product. If, for example, a crop product is tolerant of one herbicide but intolerant of another herbicide. The application table stores the information of which herbicide may be applied to the crop product. Prior to entering the field, an operator may enter the type of amendment contained in each of the hoppers 35 into the controller 20 via the user interface 29. Optionally, if the amendment includes identification devices 50, the controller may also read the data from the identification devices 50 in the amendment to verify which amendment is loaded on the agricultural vehicle 10. The controller 20 may then verify that the amendment is suitable for application to a particular crop product as identified by the data received from the identification device 50. If the amendment loaded into the agricultural vehicle 10 is identified in the application table as suitable for the crop in the field 11, the controller 20 allows the distribution system on the agricultural vehicle 10 to distribute the amendment to the field 11. If an inappropriate amendment is loaded into the agricultural vehicle 10, the controller 20 prevents the distribution system on the agricultural vehicle 10 from distributing the amendment to the field 11 and may post a warning message on the display 24 to notify the operator of the error. Thus, the tracking system may be used to prevent inadvertent application of an amendment to a crop product that may be intolerant of that amendment.

During planting and during subsequent application of amendments, the agricultural vehicle 10 may maintain a log of the product cycle. The position signal received from the positioning system 17 may be stored in the memory device 28 along with data from the identification devices 50 and or data from other sensors 15 on the vehicle 10. The other sensors 15 may provide, for example, information on the application rate of an amendment or of ambient conditions, such as temperature and/or humidity during application. Each time an agricultural vehicle. 10 traverses the field 11, the data is stored in the log. The log may be used to generate a more precise prescription map, resulting from position signals identifying the actual areas in which the seeds 21 have been planted. The log may further be used to analyze the conditions under which amendments were applied, how much of each amendment was applied, and the resulting yield of a crop.

Figure 4:
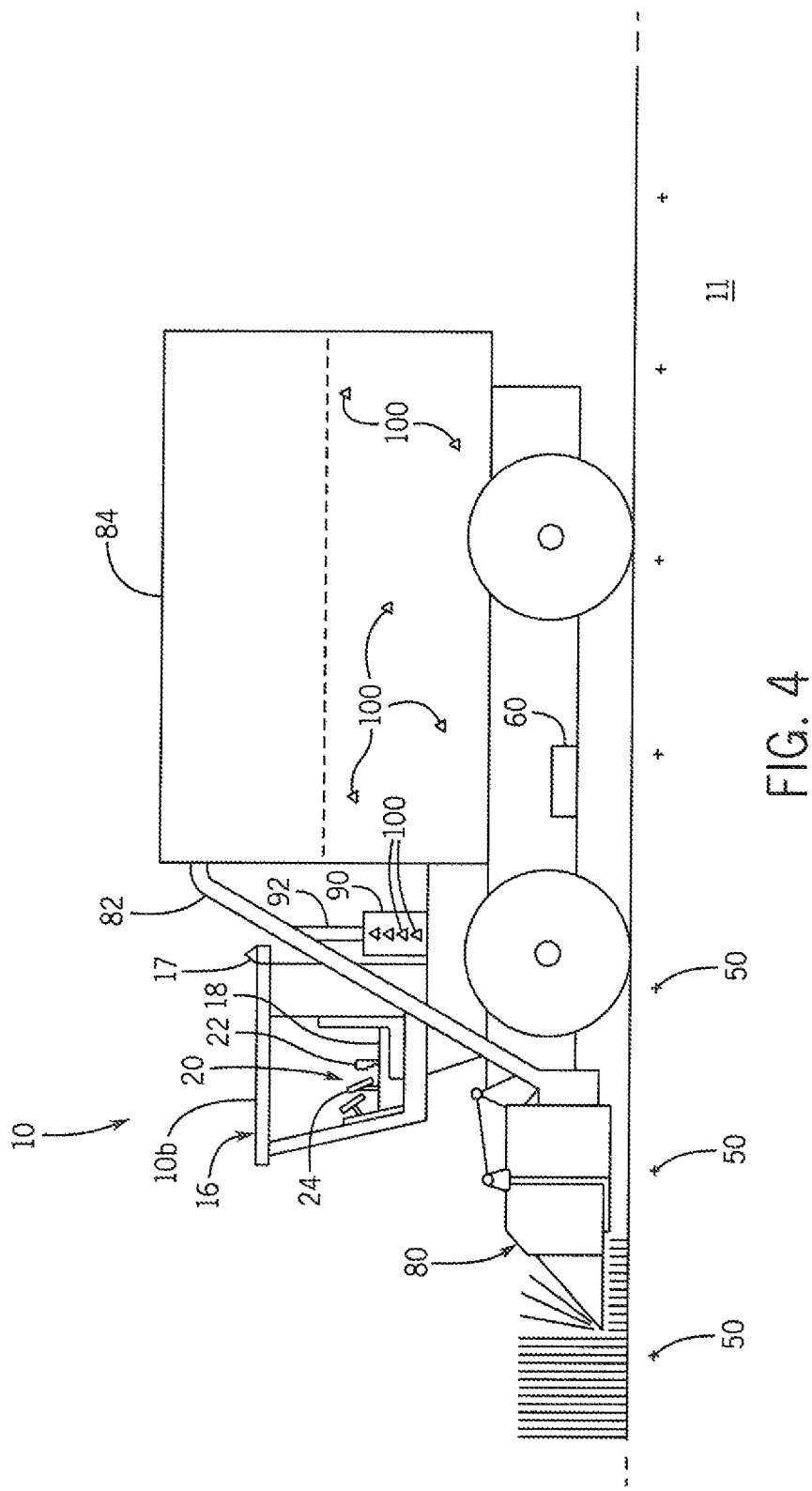
FIG. 4 is a simplified side elevation view of another exemplary agricultural vehicle implementing one embodiment of the present invention.

Referring next to FIG. 4, it is further contemplated that the tracking system may be extended to harvesting of the crop. The agricultural vehicle 10 may be a harvester 10b. The harvester 10b is configured, in part, in a similar manner to other agricultural vehicles 10 as described above with respect to FIG. 1. However, the harvester 10b also includes a head 80 configured to cut the crop being harvested. A chute 82 carries the cut crop to a tank 84 in which the harvested product is stored until it is unloaded onto another vehicle. A programmer 90 may be mounted to the harvester in which additional identification devices 100 are stored. The harvester 10b includes a reader 60 in communication with and which may read the data from the identification devices 50 in the field. The controller 20 on the harvester 10b may program all, or a portion of the data from the field identification devices 50 to the additional identification devices 100 in the programmer 90. The programmer 90 writes the data to the additional identification devices 100 and may include additional data including, for example, the date of harvesting or the position signal from the GPS unit 17, providing a location at which the product was harvested. After programming, a delivery system 92 inserts the additional identification devices 100 into the harvested product. The additional identification devices 100 are thus, carried with the harvested product to a processing plant. At the processing plant, a reader may be used to obtain the crop identification data as well as the source data such that the location of the crop supplied to the processing plant is known. The processing plant may then remove the additional identification devices 100 from the crop product prior to processing. Thus, the product cycle may be tracked from planting through harvest of each crop product grown in the field 11.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

I claim:

1. A system for tracking agricultural products applied to a field, the system comprising:
    a first plurality of identification devices receivable in a product to be applied to the field, each of the first plurality of identification devices including a communication device and a memory device storing data corresponding to the product in which each of the first plurality of identification devices is received;
    a distribution vehicle including a distribution system configured to dispense the product having the first plurality of identification devices received therein to the field, at least one sensor for sensing an ambient condition during the dispensing of the product, and a controller operatively connected to the at least one sensor;
    a second plurality of identification devices receivable in an amendment to be applied to the field, each of the second plurality of identification devices including a communication device and a memory device storing data corresponding to the amendment in which each of the second plurality of identification devices is received; and
    an agricultural vehicle for traversing the field after the product is dispensed, the agricultural vehicle being configured to apply the amendment to the field and including:
        a reader having a communication device configured to communicate with the first plurality of identification devices for receiving the data stored in each memory device of the first plurality of identification devices as the agricultural vehicle traverses the field and to communicate with the second plurality of identification devices for receiving the data in each memory device of the second plurality of identification devices; and
        a controller operatively connected to the reader for receiving the data received by the reader from the first plurality of identification devices and for receiving the data received by the reader from the second plurality of identification devices, the controller configured to determine the compatibility of the amendment and the product in response to the data received from the reader and to prevent application of the amendment to the field in response to the amendment being incompatible with the product.

2. The system of claim 1 wherein:
    each agricultural vehicle also includes a data storage device and a positioning system operable to generate a position signal;
    and
    the data from each of the first plurality of identification devices and the position signal corresponding to a location at which each of the first plurality of identification devices is read are stored in the data storage device.

3. The system of claim 2 wherein data corresponding to the amendment applied to the field is stored in the data storage device.

4. The system of claim 2 wherein each agricultural vehicle is configured to apply the amendment to the field and wherein the controller of each agricultural vehicle receives the data from each of the first plurality of identification devices and generates a plurality of control signals as a function of the data from each of the plurality of identification devices.

5. The system of claim 1 further comprising
a plurality of harvest identification devices loaded on the harvester;
a programmer mounted to the harvester, wherein the programmer writes at least a portion of the data from the first plurality of identification devices to each of the harvest identification devices; and
a delivery system configured to insert each of the harvest identification devices into the product being harvested from the field.

6. A method of tracking an agricultural product during its production cycle, the method comprising the steps of:
inserting a first plurality of identification devices within a quantity of seed for the agricultural product, wherein each of the first plurality of identification devices includes a memory device and a communication device, the memory device storing data corresponding to the seed in which the first plurality of identification devices are inserted;
distributing the first plurality of identification devices on a field along with the seed with an agricultural vehicle, wherein the agricultural vehicle is equipped with a positioning system operable to generate a position signal and distributes the first plurality of identification devices and the seed;
sensing an ambient condition during the distributing of the first plurality of identification devices on a field along with the seed;
transmitting data corresponding to the ambient condition during the distributing the first plurality of identification devices on a field along with the seed to a secondary memory device for storage;
inserting a second plurality of identification devices within an amendment, wherein each of the second plurality of identification devices includes a memory device and a communication device, the memory devices of the second plurality of identification devices storing data corresponding to the amendment in which the second plurality of identification devices are inserted;
traversing the field after the product is dispensed;
reading the data stored in each memory device of the first plurality of identification devices as the agricultural vehicle traverses the field and transmitting the data stored in each memory device of the first plurality of identification devices to a controller; and
reading the data stored in each memory device of the second plurality of identification devices and transmitting the data stored in each memory device of the second plurality of identification devices to the controller, the controller:
determining the compatibility of the amendment and the product;
allowing application of the amendment in response to the amendment being compatible with the product; and
preventing application of the amendment in response to the amendment being incompatible with the product.

7. The method of claim 6 further comprising the steps of:
reading the position signal from the positioning system while the first plurality of identification devices and the seed are distributed; and
generating a distribution map identifying where the first plurality of identification devices and the seed are distributed within the field.

8. The method of claim 6 wherein a second agricultural vehicle: is configured to apply the amendment to the field, includes a positioning system operable to generate a position signal, and includes a memory device in communication with a reader; the method further comprising the step of storing in the memory device the data from the first plurality of identification devices, the position signal from the positioning system in the second agricultural vehicle, and data corresponding to the amendment applied to the field.

9. The method of claim 6 further comprising the steps of:
writing at least a portion of the data from the first plurality of identification devices to a harvest identification device with a programmer mounted on a harvester;
harvesting the crop from the field with the harvester; and
inserting the harvest identification device into the harvested crop.

10. The method of claim 9 wherein the harvester includes a positioning system operable to generate a position signal and the position signal from the harvester is written to the harvest identification device.

11. In a precision farming system having a plurality of agricultural vehicles, wherein the precision farming system: dispenses at least one crop product to a field to begin a crop product cycle, dispenses at least one field amendment to the field during the crop product cycle, and harvests the crop product from the field to complete the crop product cycle; an improved system for monitoring the crop product cycle comprising:
a first plurality of identification devices, wherein each of the first plurality of identification devices is inserted into one of the crop products to be dispensed to the field and wherein each of the first plurality of identification devices includes a communication device and a memory device configured to store data corresponding to the crop product in which the corresponding identification device is inserted;
a distribution system on one of the plurality of agricultural vehicles configured to dispense the crop product to the field, wherein each of the first plurality of identification devices are dispensed to the field along with the crop product;
a second plurality of identification devices receivable in an amendment to be applied to the field, each of the second plurality of identification devices including a communication device and a memory device storing data corresponding to the amendment in which each of the second plurality of identification devices is received;
a second one of the plurality of agricultural vehicles for traversing the field after the crop product is dispensed, the second agricultural vehicle being configured to apply the amendment to the field and including:
a reader having a communication device configured to communicate with the first plurality of identification devices for receiving the data stored in each memory device of the first plurality of identification devices as the agricultural vehicle traverses the field and to communicate with the second plurality of identification devices for receiving the data in each memory device of the second plurality of identification devices; and
a controller operatively connected to the reader for receiving the data received by the reader from the first plurality of identification devices and for receiving the data received by the reader from the second plurality of identification devices, the controller configured to determine the compatibility of the amendment and the crop product in response to the data received from the reader and to prevent application of the amendment to the field in response to the amendment being incompatible with the crop product; and at least one sensor on the one of the plurality of agricultural vehicles for sensing an ambient condition during the dispensing of the crop product.

12. The system of claim 11 wherein:

each agricultural vehicle also includes a data storage device and a positioning system operable to generate a position signal;

the reader reads the data from each of the first plurality of identification devices via the communication link; and the data from each of the first plurality of identification devices and the position signal corresponding to a location at which each of the first plurality of identification devices is read are stored in the data storage device.

13. The system of claim 11 wherein one of the plurality of agricultural vehicles is a harvester, the system further comprising:

a plurality of harvest identification devices loaded on the harvester;

a programmer mounted to the harvester, wherein the programmer writes at least a portion of the data from the first plurality of identification devices to each of the harvest identification devices; and a delivery system configured to insert each of the harvest identification devices into the product being harvested from the field.

* * * * *